(12) United States Patent
Wright et al.

(10) Patent No.: US 10,671,670 B2
(45) Date of Patent: Jun. 2, 2020

(54) GRAPH BASED CONTENT BROWSING AND DISCOVERY

(71) Applicant: Disney Enterprises, Inc., Burbank, CA (US)

(72) Inventors: Andrew J. Wright, South Pasadena, CA (US); Benjamin F. Havey, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 548 days.

(21) Appl. No.: 15/477,406

(22) Filed: Apr. 3, 2017

(65) Prior Publication Data

US 2018/0285478 A1 Oct. 4, 2018

(51) Int. Cl.
*G06F 16/00* (2019.01)
*G06F 16/901* (2019.01)
*G06F 16/248* (2019.01)
*G06F 16/2457* (2019.01)

(52) U.S. Cl.
CPC ........ *G06F 16/9024* (2019.01); *G06F 16/248* (2019.01); *G06F 16/24578* (2019.01)

(58) Field of Classification Search
CPC ........... G06F 16/9024; G06F 16/24578; G06F 16/248; G06F 16/156; G06F 16/338; G06F 16/438; G06F 16/638; G06F 16/738; G06F 16/838; G06F 16/9038
See application file for complete search history.

(56) References Cited

U.S. PATENT DOCUMENTS

| | | | | |
|---|---|---|---|---|
| 6,564,213 | B1 * | 5/2003 | Ortega | G06F 16/3322 |
| 6,792,419 | B1 * | 9/2004 | Raghavan | G06F 16/951 |
| 9,280,580 | B1 * | 3/2016 | Lider | G06F 16/9535 |
| 10,095,669 | B1 * | 10/2018 | Karppanen | G06F 16/9577 |
| 10,339,183 | B2 * | 7/2019 | Kohlmeier | G06Q 10/10 |
| 10,394,827 | B2 * | 8/2019 | Stickler | H04L 67/10 |
| 2004/0068494 | A1 * | 4/2004 | Tozawa | G06F 16/80 |
| 2007/0162502 | A1 * | 7/2007 | Thomas | H04N 21/47202 |
| 2007/0245399 | A1 * | 10/2007 | Espelien | H04N 5/44543 725/133 |
| 2009/0055355 | A1 * | 2/2009 | Brunner | G06F 16/951 |
| 2015/0009359 | A1 * | 1/2015 | Zaheer | H04N 1/6077 348/223.1 |

(Continued)

*Primary Examiner* — Noosha Arjomandi
(74) *Attorney, Agent, or Firm* — Patterson + Sheridan, LLP (57) ABSTRACT

Systems and methods for using graph databases to make digital content recommendations are described. A graph database may be associated with tagged digital content. The graph database may include a node for each content tag and edges identifying a relationship between nodes. When a user accesses or searches a digital content item, the graph database may be traversed to identify and present related content recommendations to the user based on the traversed nodes. Node graph traversal may initiate from a root node associated with a tag of content item being presented to a user. Nodes may be searched based on their proximity to the root node as determined by edge connections of the graph. Initially searched nodes may include nodes in the graph database directly connected by edges to the root node. Subsequently searched nodes may include nodes one edge connected removed from the root node, and so forth.

20 Claims, 7 Drawing Sheets

(56) References Cited

U.S. PATENT DOCUMENTS

| | | | | |
|---|---|---|---|---|
| 2015/0339405 | A1* | 11/2015 | Vora | G06F 16/24575 |
| | | | | 707/706 |
| 2016/0063093 | A1* | 3/2016 | Boucher | G06F 16/90324 |
| | | | | 707/748 |
| 2016/0063115 | A1* | 3/2016 | Ayan | G06Q 50/01 |
| | | | | 707/722 |
| 2016/0171588 | A1* | 6/2016 | Linden | G06Q 30/0631 |
| | | | | 705/26.7 |
| 2016/0373543 | A1* | 12/2016 | Alla | H04L 67/2842 |
| 2017/0040017 | A1* | 2/2017 | Matthews | G10L 25/57 |
| 2018/0285478 | A1* | 10/2018 | Wright | G06F 16/9024 |
| 2019/0138656 | A1* | 5/2019 | Yang | G06N 20/00 |
| 2019/0236093 | A1* | 8/2019 | Andavarapu | H04H 60/72 |

* cited by examiner

GRAPH BASED CONTENT BROWSING AND DISCOVERY

TECHNICAL FIELD

The present disclosure relates generally to making digital content recommendations, and more particularly, to using graph databases to make digital content recommendations.

DESCRIPTION OF THE RELATED ART

The volume of digital content that users have access to through online services is increasing exponentially. In July 2015, 400 hours of new content was being uploaded to YouTube® every minute. In March 2016, Netflix® had over 4000 movies and 1100 TV shows on offer. This just illustrates some examples of the rapid growth of video content. When images, new articles, social posts, and other types of content are considered, the growing volume of digital content is vast. In such an environment, one of the challenges is providing a means for users navigate this vast array of content and discover new content.

BRIEF SUMMARY OF THE DISCLOSURE

According to various embodiments, systems and methods are described for using graph databases to make digital content recommendations. Prior to making digital content recommendations, a graph database may be created to provide a mapping of the relationships of the content tags of media content files. The graph database may be created by ingesting media content files, tagging the media content file with one or more tags, associating each tag with a node, and connecting the nodes with edges that define the relationship between nodes.

In one embodiment, a method of making content recommendations may include: receiving data identifying a content item being presented to a user; in response to receiving the data identifying the content item being presented to the user, selecting a node from a graph database to begin a search for related content recommendations, where the selected node is associated with a tag of the content item begin presented; searching for nodes in the graph database directly connected by edges to the selected node; and using at least the searched nodes directly connected by edges to the selected node to identify a set of content related to the content item being presented to the user, where each of the searched nodes is associated with a tag of a digital content item; and presenting related content recommendations to the user based on the identified set of related content.

In particular implementations, the content item being presented to the user may be a video content item, and the user may be associated with a user account configured to receive video content from the server system over the network. In other implementations, the content item being presented to user may include audio content, a game, an application, images, or other content.

In implementations, the method may further include the steps of determining whether to search for additional related content using at least the identified set of content related to the content item being accessed by the user; and searching for nodes in the graph database one edge connection removed from the selected node. The searched nodes one edge connection removed from the selected node may be used to identify a set of content related to the content item being presented to the user, where each of the searched nodes one edge connection removed from the selected node is associated with a tag of a digital content item.

In one embodiment, identifying a set of related content using at least the searched nodes includes determining whether each of the searched nodes has a node property.

In a further embodiment, identifying a set of related content using at least the searched nodes includes determining a weight of each of the searched nodes. In this embodiment, the weight of each of the searched nodes may be determined using at least user account data that provides a history of the user's prior access of content associated with the searched nodes. The weight of each of the searched nodes may also be determined using at least data received from an external data source, where the external data source comprises a social media platform. For example, the weight of one of the searched nodes may be determined using at least social media trends relating to a tag associated with that node.

In yet a further embodiment, the presented related content recommendations are presented in an order determined at least in part by the determined weight of each of the searched nodes.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION

As noted above, in today's growing digital content environment, one of the challenges is providing a means for users to navigate the vast array of digital content and discover new digital content. At the current scale of digital content availability, relational database models and hierarchical database models may not be suitable for efficiently navigating and searching such content, let alone presenting related content options.

Embodiments described herein are directed to addressing these problems. As described herein, a graph database may be associated with a pool of tagged digital content. The graph database may include a node for each content tag and edges identifying a relationship between nodes. When a user accesses or searches a digital content item, the graph database may be traversed to identify and group related content items to present to the user (e.g., as a set of related content recommendations). By traversing a graph database to search for related content items, more relevant content recommendations and faster content navigation and discovery may be achieved.

Figure 1:
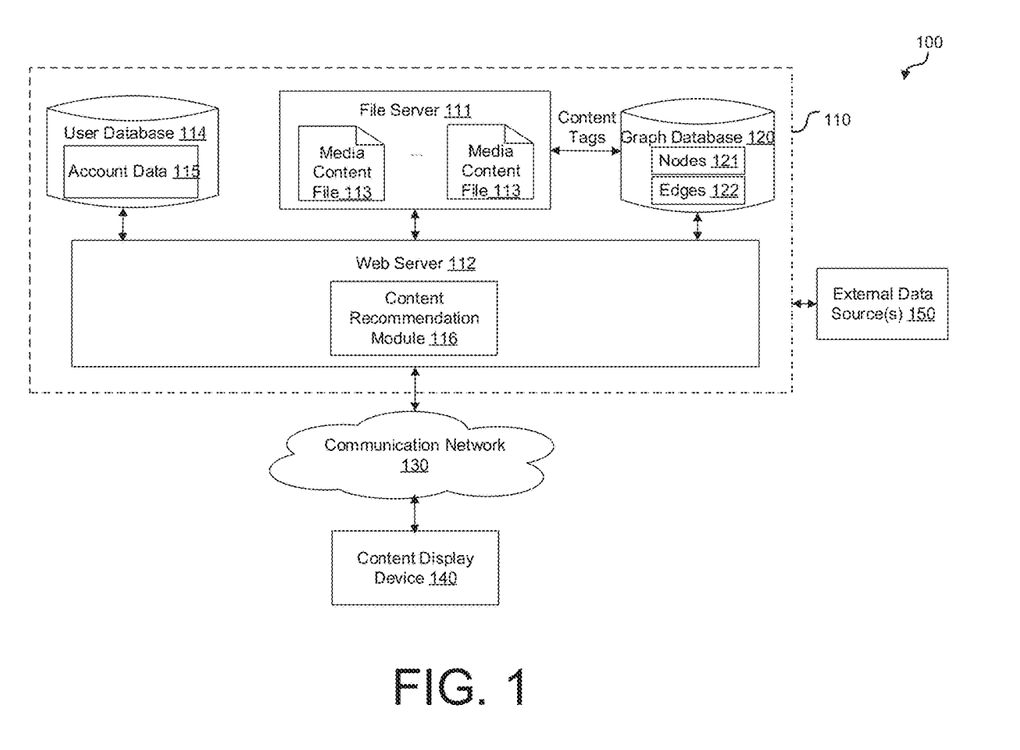
FIG. 1 is a high-level block diagram illustrating an example environment for delivery of media content in which the disclosure can be implemented.

FIG. 1 is a high-level block diagram illustrating an example environment 100 for delivery of digital content in which the invention can be implemented. As illustrated in environment 100, a server system 110 includes file server 111 that stores media content files 113 that are delivered by web server 113 to one or more display devices 140 over communication network 130 (e.g., a cellular network, satellite network, cable network, optical network, etc.). In various embodiments, media content files 113 may include applications, games, images, video for home release of a movie, video of a show or series, audio, social posts, and any other content that has tags or metadata associated with it.

In some embodiments, web server 112 and file server 111 may be integrated as a single server. In particular embodiments, server system 110 is part of a content delivery network (CDN). In such embodiments, the CDN may comprise a plurality of file servers 111 and a plurality of web servers 112. The plurality of file servers 111 may comprise the same media content files 113 or customized media content files, depending on the regions where they deliver the media content. File servers 111 and web servers 112 may operate as a file server and web server pair (e.g., integrated as a single server or operating as two complementary servers), operate independently, or operate as some combination thereof.

The stored media content files 113 are assigned or otherwise associated with tags identifying the specific attributes of the content of the media files. Each media content file 113 may have one or more tags assigned. The assigned tags may specify, for example, the title of the content (e.g., movie or show name), the content genre (e.g., action, education, drama, etc.), the names of actors that appear in the content, the producer of the content, the director of the content, the author of the content, the names of characters that appear in the content, the names of places that appears in the content, the brand or franchise associated with the content, additional subcategories of the content genre (e.g., for educational genre: math, science, nature, literature, etc.), the lead character type of the content (e.g., female, male, alien, robot, etc.), and other attributes of the content.

In various embodiments, each tag may correspond to a respective node 121 in graph database 120. As media content files 113 are ingested in to server system 110, the content files may be tagged with one or more tags, and each tag may be associated with a node. As such, a media content file 113 may be associated with one or more nodes 121 of graph database 120. Where new tags are created, new nodes 121 may be created and associated with the content files. As such, in various implementations, a node may be created for each unique tag that is added to the system. New edges 122 may be created to map the relationship between new nodes and other nodes.

Graph database 120 includes a plurality of vertices or nodes 121 and a plurality of edges 122 that connect the nodes to form a graph. In various implementations, further described below, the graph of graph database 120 may be traversed to provide content recommendations (i.e., content associated with media content files 113) to a user of content display device 140.

Each node 121 represents an entity that may be associated with a unique content tag in system 110. For example, a node may represent an actor, a director, a producer, a character, a film name, a genre, a franchise, or other entity that corresponds to a content tag. Each edge 122 represents a relationship from one node to another node. As such, the graph of graph database 120 may provide a mapping of the relationships of the content tags of media content files 113. In implementations, a set of properties may be assigned to each node 121 and a set of properties may be assigned to each edge 122.

Figure 2:
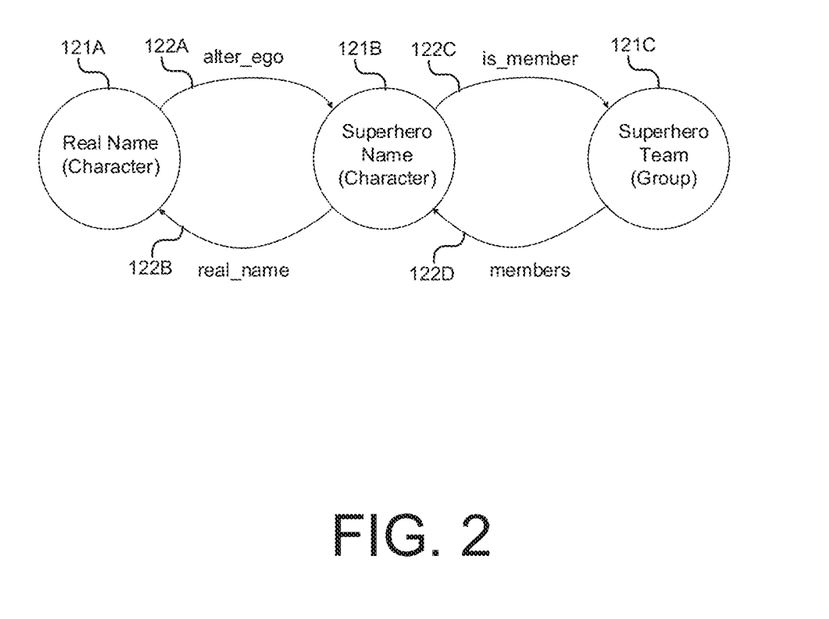
FIG. 2 provides an example three-node illustration of how the relationships of nodes may be defined by edges on a node graph.

FIG. 2 provides an example three-node illustration of how the relationships of nodes 121 may be defined by edges 122 on a node graph. As illustrated in the example of FIG. 2, node 121A has the associated tag "Real Name" and the property character, node 121B has the associated tag "Superhero Name" and the property character, and node 121C has the associated tag "Superhero Team" and the property Group. Edge 122A maps the relationship out from node 121A into node 121B as "alter_ego" (i.e., the alter ego of "Real Name" is "Superhero Name"). Edge 122B maps the relationship out from node 121B into node 121A as "real_name." Similarly, edge 122C maps the relationship out from node 121B into node 121C, and edge 122D maps the relationship out from node 121C into node 121B.

Figure 3:
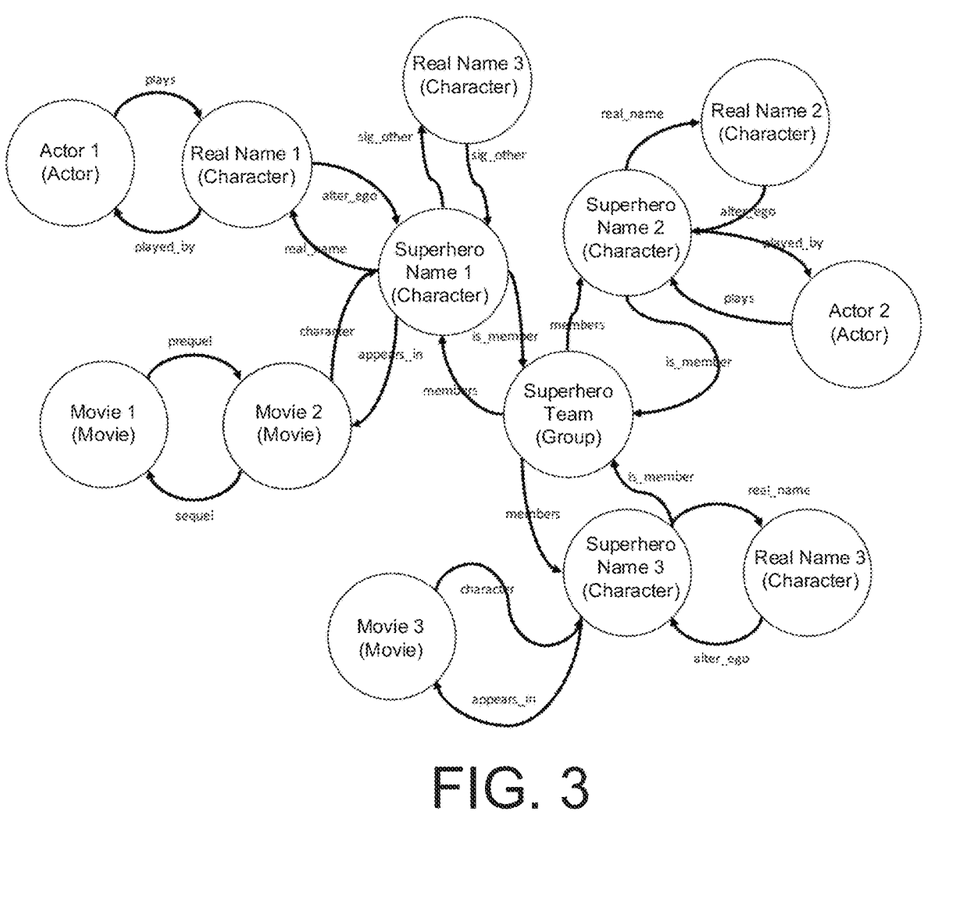
FIG. 3 provides an example illustration of a node graph that associates nodes with tags to map the relationship between digital content items.

FIG. 3 provides an example illustration of a node graph that associates nodes with tags to map the relationship between content items. In the particular example of FIG. 3, a node graph is created using content tags of superhero movies. As illustrated in this example, nodes with the associated tags "Movie 1", "Movie 2", or "Movie 3", correspond to a movie. Nodes with the tags "Superhero Name 1", "Superhero Name 2", and "Superhero Name 3" correspond to a superhero character name that appears in one or more of these movies. Nodes with the tags "Real Name 1", "Real Name 2", and "Real Name 3" correspond to a respective superhero character's real name. Nodes with the tags "Actor 1", "Actor 2", and "Actor 3" correspond to an actor that plays one of these superhero characters. It should be noted that although FIG. 3 illustrates a simplified example of a node graph, in practice, graph database 120 may comprise thousands, millions, or even billions of nodes 121 and edges 122.

Referring again to FIG. 1, server system 110 may also include a user database 114 for storing user account data 115 associated with one or more user accounts registered to receive content from server system 110 (e.g., a content delivery network). The stored user account data 115 may include, for example, an identification of the primary user's name, an account name, an account password, information relating to the user's account subscription, and the like. Additionally, user account data 115 may include a history of the content consumed by the user account such as, for example, the time and date during which a media file 113 was consumed by the user account, the portions of media file 113 consumed by the user account, and tags or nodes associated with the media files 113 consumed by the user account. As further described below, in various embodiments, the history of the content consumed by the user account may be used to perform a weighted traversal or search of the nodes of graph database 120.

In exemplary environment 100, web server 112 delivers media content files 113 over communication network 120 to a content display device 130 logged in to an authorized user account having associated user account data 115. During, before, or after delivery of media content, a content recommendation module 116 of web server 112 may traverse graph database 120 to provide a set of content recommendations to the user. For example, a set of content recommendations related to a content item currently being accessed by the user may be provided. As would be understood by one having skill in the art, this set of content recommendations may inform the display of a graphical user interface of a content consumption application executed or used by content display device 130 to access and display content 113. For example, in embodiments where graphical user interface is provided for playing video, a set of content recommendations (e.g., videos) related to the video may be provided along a bottom or right edge of the graphical user interface. The user may select one of the displayed set of content recommendations, which may then be delivered by web server 112.

In implementations, the media content 113 may be downloaded by content display device 130 prior to any media display, streamed to display device 130 during media display, or downloaded and streamed by display device 130 in any combination. Content display device 130 may be a smart television, a set top box, a gaming console, a laptop, a smartphone, a tablet, or other device that may display content and content recommendations made available by server system 110.

In some embodiments, further described below, external data sources 150 may provide social media data or other data inputs to perform a weighted search of the nodes of graph database 120.

Figure 4:
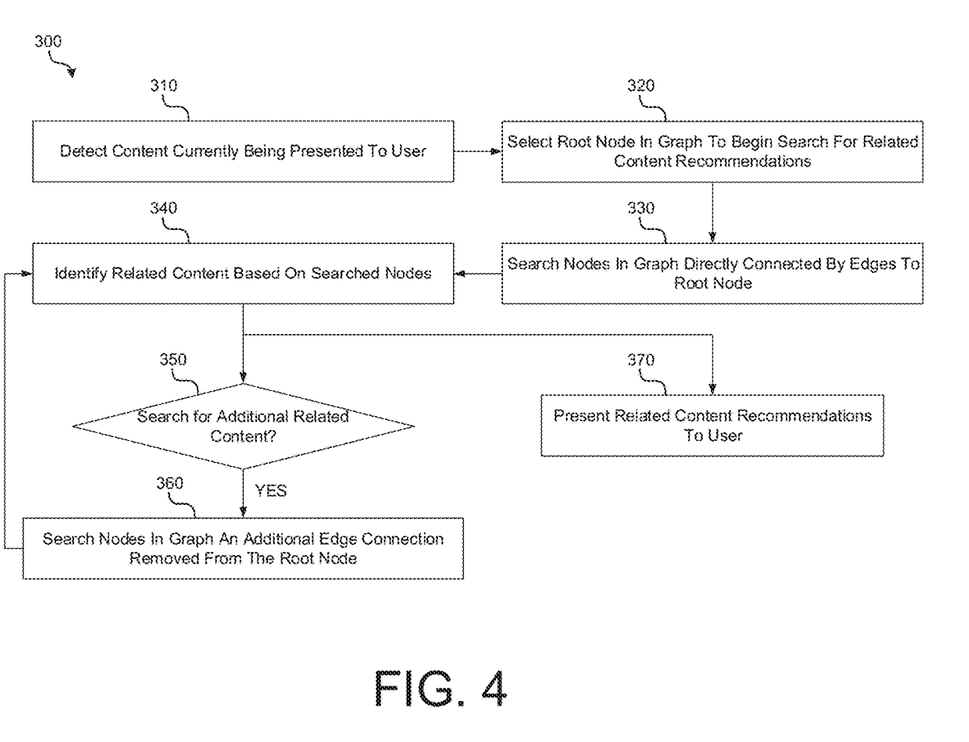
FIG. 4 is an operational flow diagram illustrating an example method that may be performed by a content recommendation module to traverse a graph of a graph database and provide content recommendations to a user of a content display device.

FIG. 4 is an operational flow diagram illustrating an example method 300 that may be performed by content recommendation module 116 to traverse the graph of graph database 120 and provide content recommendations to a user of a content display device 140. Method 300 will be described in conjunction with FIG. 5, which provides a visual illustration of the traversal of a graph in accordance with method 300. It should also be noted that although method 300 will primarily be described with respect to providing video content recommendations to a user, method 300 may be used to provided recommendations of other digital content, including images, games, audio, social media posts, and the like.

Prior to performing method 300, server system 100 may build a graph of nodes 121 and edges 122 in graph database 120 that provide a mapping of the relationship between media content files. As alluded to above, the graph of graph database 120 may be built by ingesting media content files 113, tagging the media content file with one or more tags, associating each tag with a node 121, and connecting the nodes with edges 122 that define the relationship between nodes. Additionally, prior to beginning method 300, a user of a content display device 140 may set up a user account for receiving media content 113 from a server system 110 using methods known in the art.

At operation 310, content currently being presented to the user is detected. For example, a user account associated with a content display device 140 may be playing a media content file 113 (e.g., a movie) using a graphical user interface of a content consumption application.

At operation 320, based on the detected content currently being presented to the user, a root node 210 is selected from the graph of database 120 to begin a search for related content recommendations. For example, if a user is watching a movie, a node having an associated tag corresponding to the movie name and a property "movie" may be selected. Using the graph of FIG. 3 as an example, if the user is watching Movie 2, then a node having the "Movie 2" tag and property "movie" is selected to begin a node graph traversal. As another example, if the user is listening to a particular audio track, a node having an associated tag corresponding to the audio track's name may be selected.

Following selection of a root node, at operation 330, a search of nodes in the graph directly connected by edges to the root node is performed. This search is visually illustrated by FIG. 5, which shows nodes 220 connected to node 210. In various implementations, operation 330 may be performed to find all neighboring nodes 220 by traversing all edges coming out of or going into root node 210. For example, referring again to the graph of FIG. 3, if the root node is the "Movie 2" node, then traversing the graph to find neighboring nodes arrives at two neighboring nodes: "Movie 1" having the property "movie" and "Superhero Name 1" having the property "character."

At operation 340, a set of related content (e.g., content corresponding to media content files 113 and related to the content currently being presented to the user) may be identified based on the searched nodes 220 and root node 210. Related content may be identified through the associated tags of the searched nodes 220 and root node 210. For example, for each searched node 220 having an associated tag, content tagged with the associated tag may be identified.

In some embodiments, the set of identified related content may be filtered during graph traversal based on the properties of each node. For instance, referring to the example of FIG. 3, if the nodes for which related content is identified is restricted to nodes that only have the "character" property, content may be considered only for those nodes that have a label of "character" (e.g., "Superhero Name 1"). In this example, the result is that content is identified as related content only if it is tagged with characters related to a movie.

Figure 6:
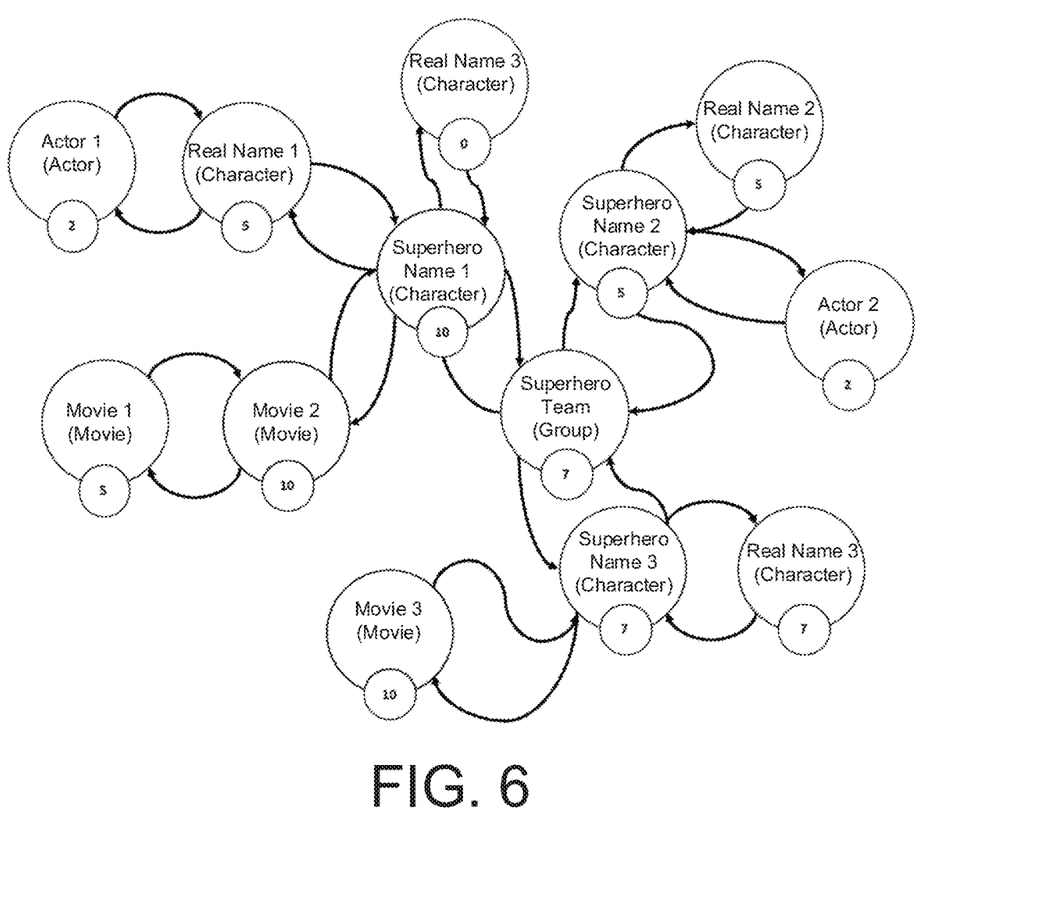
FIG. 6 illustrates the node graph of FIG. 3 with weights applied to each node.

In some embodiments, the set of identified related content may be filtered based on an amount of weighting associated with each node. For example, if the weighting of a node is above a predetermined threshold, content associated with that node may be identified as related content. Conversely, if the weight of a node is below a predetermined threshold, content associated with that node may be disregarded. By way of example, FIG. 6 illustrates the node graph of FIG. 3 with weights applied, where a weight of 10 is the highest weight that could be applied. If a weight threshold of 4 were applied during identification of related content, then the "Actor 1" node, the "Real Name 3" node, and the "Actor 2 node" could be disregarded for the purpose of identifying related content when each of those nodes is found during traversal of the graph.

In some implementations, weighting may be determined for each node based on user account data 115 that provides a history of a user's prior interactions with content associated with that node. For example, each time a user account interacts with tagged content, this may be recorded against the associated node or nodes. Increasing interactions with a node may be used to raise the weight of a given node. For example, in the case of FIG. 6, content tagged with the tags "Superhero Name 1" and "Movie 3" may have a high number of interactions, and the corresponding nodes may be assigned a weight of 10. Conversely, content tagged with "Real Name 3" may have no interactions and the corresponding node may be assigned a weight of 0.

In additional implementations, weighting may be determined for each node based on external data received from an external data source 150 (e.g., social data). For example, if a particular tag corresponding to a node in the graph database 120 was trending on a social media platform (e.g., Twitter® or Facebook®) then that node could be considered more relevant and given greater weight. Such a weighting could be determined prior to graph traversal (e.g., on a periodic basis) by mapping social traffic, statistics and data to weights of nodes of graph database 120. Other external data that could be used to determine the weighting of nodes might include, for example, box office performance of films, sales data, aggregate review scores of the content, and the like.

In yet further implementations, the weighting of nodes can be applied to increasing levels of granularity for the population of users for a given service or experience. The interactions and the associated weighting can be tracked and calculated for the entire population, a segment of the population (e.g. by demographic) or ultimately on an individual basis, all at a per node level.

It should be noted that although nodes of the node graph may be disregarded for the purpose of identifying related content during traversal of the graph (e.g., based on a filter or weight), the node may still be used during subsequent expansions of the graph (further described below) to find additional nodes.

Figure 5:
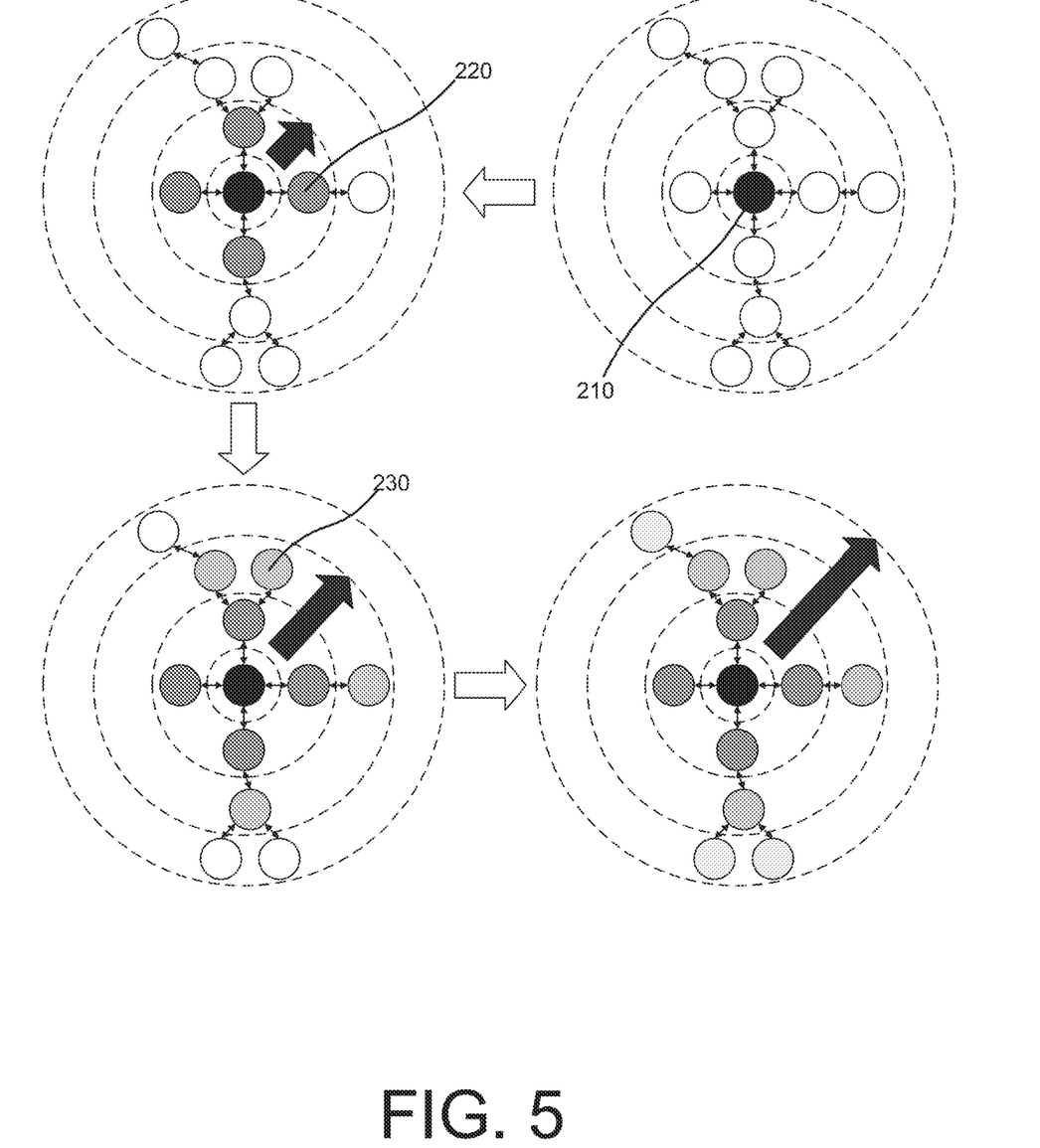
FIG. 5 provides a visual illustration of the traversal of a graph in accordance with method of FIG. 4.

At decision 350, it is determined whether to search for additional related content. In various embodiments, the decision may be based on whether a sufficient amount of related content has been identified, whether the identified related content is associated with nodes having a sufficiently high weight, whether the user has arrived at the end of a list of currently presented related content, or some combination thereof. For example, if only two items of related content are identified, or if all of the identified related content is associated with low node weights, the traversal of the graph may continue. In such a scenario, at operation 360 nodes in the graph an additional edge connection removed from the root node may be searched. For instance, as illustrated in the example of FIG. 5, operation 360 may be performed to find all nodes 230 by traversing all edges coming out of or going into nodes 220. Thereafter, operations 340-360 may iterate until it is determined that there is no need to search for an additional edge connection removed from the root node. As would be appreciated by one having skill in the art, for each additional connection removed from the root node, the number of available nodes may scale exponentially. As such, after a few iterations, the vast amount (if not all) of the nodes of graph database 120 may be traversed.

As illustrated in the example of FIG. 4, following identification of related content at operation 340, at operation 370 related content recommendations may be presented to a user. In various implementations the presentation of related content recommendations may be ordered based on the weight of nodes associated with the content, In the example of FIG. 4, the presentation of related content recommendations may occur even as the node graph is being further traversed. Alternatively, in other embodiments the related content recommendations are not made until it is determined at decision 350 that there is no need to search for additional related content.

Following presentation of related content recommendations to the user, if the user selects related content, a node associated with the related content may become the root node and method 300 may be repeated again to identify a new set of related content.

Figure 7:
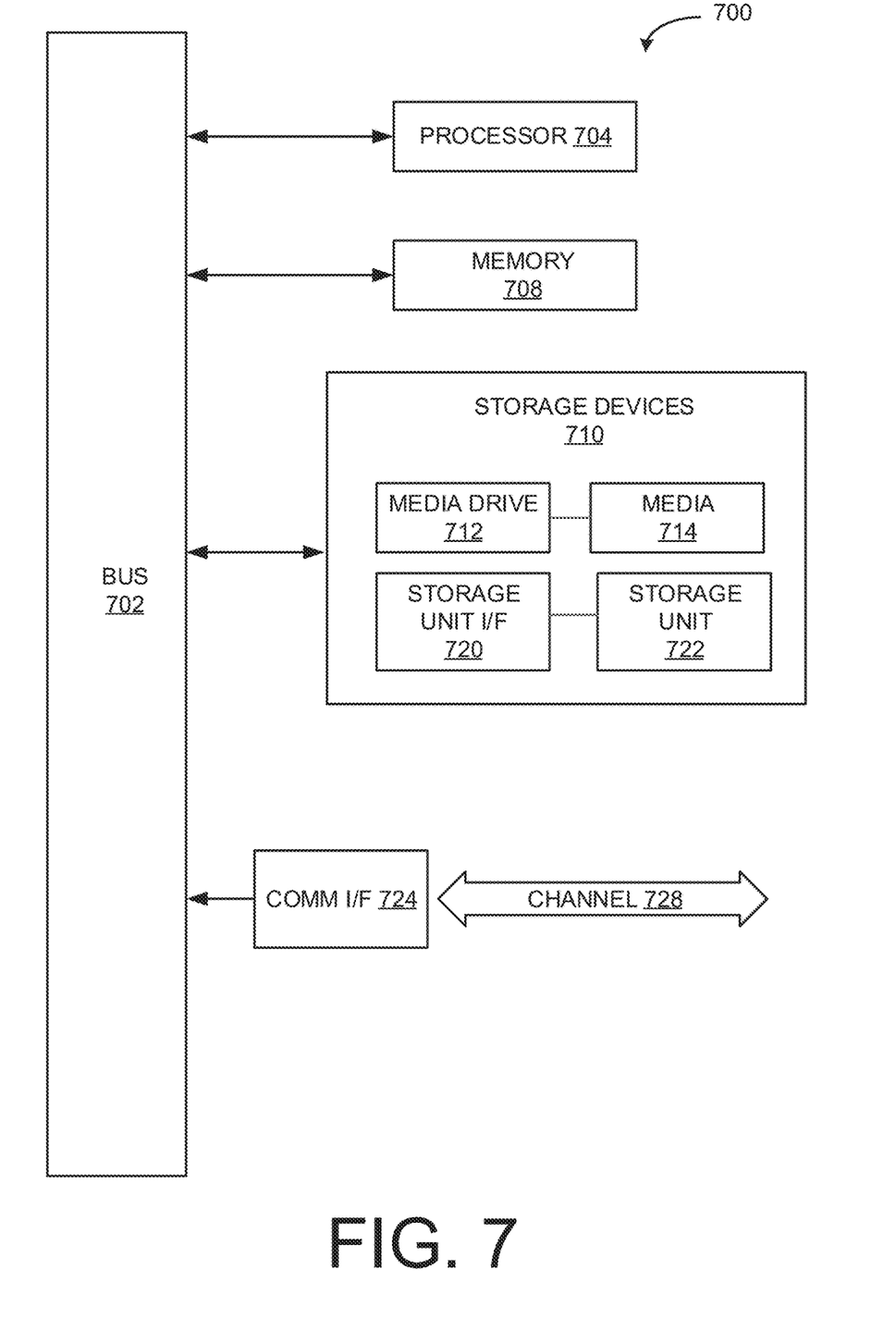
FIG. 7 illustrates an example computing module that may be used to implement various features of the system and methods disclosed herein.

FIG. 7 illustrates an example computing component that may be used to implement various features of the system and methods disclosed herein, such as the aforementioned features and functionality of one or more aspects of content recommendation module 116 of server system 110.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 700. After reading this description, it will become apparent to a person skilled in the relevant art how to implement the application using other computing modules or architectures.

Referring now to FIG. 7, computing module 700 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid state drive, a magnetic tape drive, an optical disk drive, a CD or DVD drive (R or RW), or other removable or fixed media drive might be provided. Accordingly, storage media 714 might include, for example, a hard disk, a solid state drive, magnetic tape, cartridge, optical disk, a CD, DVD, or Blu-ray, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 708, storage unit 722, and media 714. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

What is claimed is:

1. A method, comprising:
   receiving data identifying a first content item being presented to a user via a content delivery network, wherein the user is associated with a user account;
   in response to receiving the data identifying the first content item being presented to the user, selecting a first node from a graph database to begin a search for one or more additional content items, the one or more additional content items related to the first content item, the one or more additional content items including a second content item, wherein the first node corresponds to a first content tag, wherein selecting the first node includes determining that the first content item is tagged with the first content tag, wherein the first content item comprises a first video content item and the second content items comprises a second video content item;
   searching, by operation of one or more computer processors, for a second node in the graph database that is directly connected to the first node by an edge, wherein the second node corresponds to a second content tag;
   identifying, using the second node, the second content item, wherein identifying the second content item includes determining that the second content item is tagged with the second content tag; and
   after identifying the second content item, outputting one or more content recommendations to present to the user, the one or more content recommendations including a recommendation of the second content item, wherein the second content item is output via the content delivery network to present to the user.

2. The method of claim 1, further comprising: determining whether or not to continue searching for the one or more additional content items after identifying the second content item.

3. The method of claim 1, further comprising: searching for a third node in the graph database that is one edge connection removed from the first node, wherein the third node corresponds to a third content tag.

4. The method of claim 3, wherein the one or more additional content items include a third content item, the method further comprising: identifying, using the third node, the third content item, wherein identifying the third content item includes determining that the third content item is tagged with the third content tag.

5. The method of claim 1, wherein identifying the second content item comprises determining that the second node has a node property.

6. The method of claim 1, wherein the one or more additional content items include a third content item, the method further comprising:
   searching for a third node in the graph database that is directly connected to the first node by another edge, wherein the third node corresponds to a third content tag; and
   identifying, using the third node, the third content item, wherein identifying the third content item includes determining that the third content item is tagged with the third content tag, wherein identifying the second content item and identifying the third content item comprise: determining a first weight of the second node and determining a second weight of the third node.

7. The method of claim 6, wherein the first weight and the second weight are determined based on user account data including a history of prior access by the user of one or more content items tagged with the second content tag or the third content tag.

8. The method of claim 6, wherein the first weight and the second weight are determined based on external data received from an external data source, the external data indicating that the second content tag or the third content tag is trending on a social media platform.

9. The method of claim 6, wherein the one or more content recommendations include a recommendation of the third content item, the method further comprising: ordering the recommendation of the second content item and the recommendation of the third content item based on the first weight and the second weight.

10. The method of claim 1, wherein the one or more content recommendations are presented via a server system of the content delivery network.

11. A system, comprising:
    a graph database; and
    a non-transitory computer-readable medium operatively coupled to a processor and having instructions stored thereon that, when executed by the processor, causes the system to:
      receive data identifying a first content item being presented to a user via a content delivery network, wherein the user is associated with a user account;
      in response to receiving the data identifying the first content item being presented to the user, select a first node from the graph database to begin a search for one or more additional content items related to the first content item, the one or more additional content items including a second content item, wherein the first node corresponds to a first content tag, wherein selecting the first node includes determining that the first content item is tagged with the first content tag, wherein the first content item comprises a first video content item and the second content item comprises a second video content item;
      search for a second node in the graph database that is directly connected to the first node by an edge, wherein the second node corresponds to a second content tag; and identify, using the second node, the second content item, wherein identifying the second content item includes determining that the second content item is tagged with the second content tag; and after identifying the second content item, output one or more content recommendations to present to the user, the one or more content recommendations including a recommendation of the second content item, wherein the second content item is output via the content delivery network to present to the user.

12. The system of claim 11, wherein the instructions, when executed by the processor, further cause the system to: determine whether or not to continue searching for the one or more additional content items after identifying the second content item.

13. The system of claim 11, wherein the instructions, when executed by the processor, further cause the system to: search for a third node in the graph database that is one edge connection removed from the first node, wherein the third node corresponds to a third content tag.

14. The system of claim 13, wherein the one or more additional content items include a third content item, wherein the instructions, when executed by the processor, further cause the system to: identify, using the third node, the third content item, wherein identifying the third content item includes determining that the third content item is tagged with the third content tag.

15. The system of claim 11, wherein identifying the second content item comprises determining that the second node has a node property.

16. The system of claim 11, wherein the one or more additional content items include a third content item, wherein the instructions, when executed by the processor, further cause the system to:
search for a third node in the graph database that is directly connected to the first node by another edge, wherein the third node corresponds to a third content tag; and
identify, using the third node, the third content item, wherein identifying the third content item includes determining that the third content item is tagged with the third content tag, wherein identifying the second content item and identifying the third content item comprise: determining a first weight of the second node and determining a second weight of the third node.

17. The system of claim 16, wherein the first weight and the second weight are determined based on user account data including a history of prior access by the user of one or more content items tagged with the second content tag or the third content tag.

18. The system of claim 16, wherein the first weight and the second weight are determined based on external data received from an external data source, the external data indicating that the second content tag or the third content tag is trending on a social media platform.

19. The system of claim 16, wherein the one or more content recommendations include a recommendation of the third content item, wherein the instructions, when executed by the processor, further cause the system to: order the recommendation of the second content item and the recommendation of the third content item based on the first weight and the second weight.

20. A non-transitory computer-readable medium containing a program executable to perform an operation comprising:
receiving data identifying a first content item being presented to a user via a content delivery network, wherein the user is associated with a user account;
in response to receiving the data identifying the first content item being presented to the user, selecting a first node from a graph database to begin a search for one or more additional content items, the one or more additional content items related to the first content item, the one or more additional content items including a second content item, wherein the first node corresponds to a first content tag, wherein selecting the first node includes determining that the first content item is tagged with the first content tag, wherein the first content item comprises a first video content item and the second content item comprises a second video content item;
searching, by operation of a processor when executing the program, for a second node in the graph database that is directly connected to the first node by an edge, wherein the second node corresponds to a second content tag;
identifying, using the second node, the second content item, wherein identifying the second content item includes determining that the second content item is tagged with the second content tag; and
after identifying the second content item, outputting one or more content recommendations to present to the user, the one or more content recommendations including a recommendation of the second content item, wherein the second content item is output via the content delivery network to present to the user.

* * * * *